UNITED STATES PATENT OFFICE.

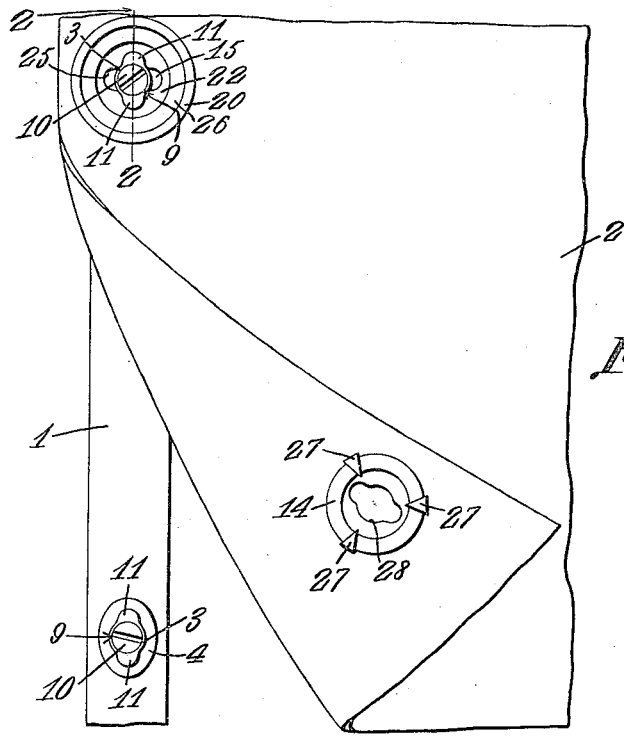
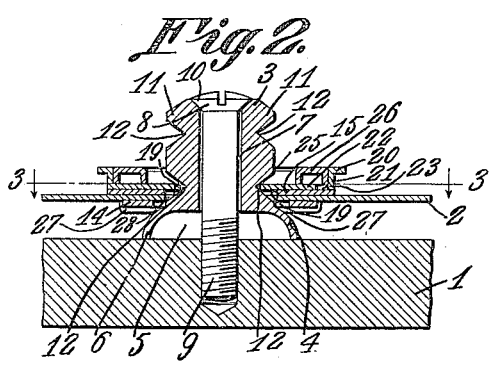
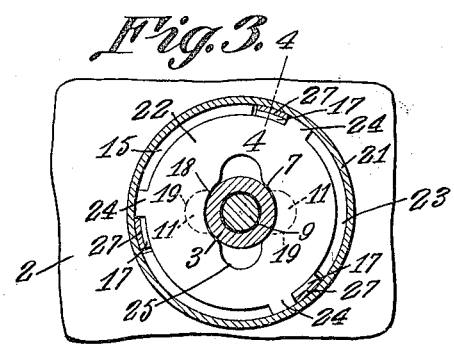
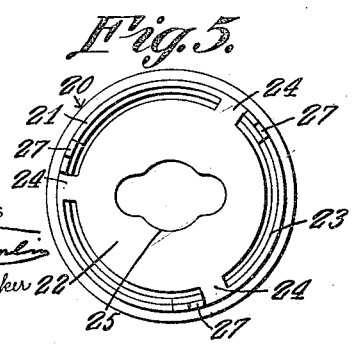
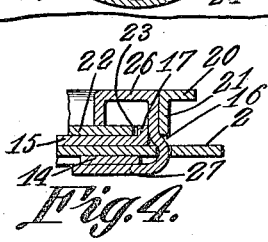
R. R. VAN HORN.
FASTENER FOR VEHICLE CURTAINS.
APPLICATION FILED APR. 4, 1916.
1,209,783. Patented Dec. 26, 1916.
R. R. Van Horn, Inventor

ROBERT ROSS VAN HORN, OF COLUMBUS, OHIO.

FASTENER FOR VEHICLE-CURTAINS.

1,209,783.      Specification of Letters Patent.     Patented Dec. 26, 1916.

Application filed April 4, 1916. Serial No. 88,876.

*To all whom it may concern:*

Be it known that I, ROBERT R. VAN HORN, a citizen of the United States, residing at Columbus, in the county of Franklin and State of Ohio, have invented a new and useful Fastener for Vehicle-Curtains, of which the following is a specification.

The device forming the subject matter of this application is adapted to be employed for attaching vehicle curtains to the bows of a vehicle.

The invention aims to improve the construction of the stud, which, being secured to the bow, coacts with a rotary fastening means on the curtain.

Another object of the invention is to improve the fastening means which the curtain carries.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, Figure 1 shows in elevation, a portion of a vehicle bow and a curtain wherewith the fastening means forming the subject matter of this application has been assembled, a portion of the curtain being swung backwardly; Fig. 2 is a section taken on the line 2—2 of Fig. 1; Fig. 3 is a section taken on the line 3—3 of Fig. 2; Fig. 4 is a fragmental cross section taken on the line 4—4 of Fig. 3; Fig. 5 is a bottom plan of the rotary button.

The fastener forming the subject matter of this application preferably is made of metal throughout.

In the drawings, the numeral 1 indicates a vehicle bow, the numeral 2 indicating a curtain. The invention comprises a stud including a body 3 having a base 4 provided with a cavity 5 defining a marginal flange 6 adapted to bite into the bow 1, to aid in holding the stud in place. The body 3 is provided with a central bore 7 which is countersunk at its outer end as shown at 8.

The numeral 9 indicates a securing element of any desired sort, in the present instance but not necessarily taking the form of a screw threaded into the bow 1 and located in the bore 7, the screw 9 being provided with a head 10 received in the countersunk portion 9 of the body 3 of the stud. The body 3 of the stud is provided with opposed longitudinal ribs 11 having spaced notches 12, a plurality of pairs of notches 12 being provided so that, as will be understood when the description of the invention is proceeded with, the curtain 2 may be secured to the stud at different distances from the bow 1 and so that, if desired, more than one curtain may be connected to each stud.

The invention comprises a backing plate 14, preferably in the form of a ring, and placed against the under side of a curtain 2. Disposed against the forward side of the curtain 2 is a face plate 15 having notches 16. At the bases of the notches 16, projecting tongues 17 are formed, as shown best in Fig. 4, these tongues extending forwardly with respect to the curtain 2. In the face plate 15 there is fashioned an opening 18 having lateral extensions 19. In the curtain 2, within the contour of the backing plate or ring 14, is formed an opening 28 which preferably corresponds in shape to the opening 18, although the specific outline of the opening 28 is to some extent immaterial.

The invention comprises a rotary button denoted generally by the numeral 20 and including a flange 21 and a bottom 22. Close to the flange 21, the bottom 22 is provided with arcuate slots 23 defining ribs 24 which connect the flange with the bottom. In the bottom 22 of the rotary button there is formed an opening 25 corresponding in shape to the opening 18 in the face plate 15.

The numeral 26 denotes an annular retainer which is trough-shaped in cross section, as shown best in Fig. 4, the retainer 26 being located within the contour of the flange 21 of the button 20. Upon its outer wall, the retainer 26 is provided with bendable prongs 27. These prongs 27 pass through the slots 23 in the bottom 22 of the button 20 and pass through the notches 16 in the face plate 15, in contact with the tongues 17 of the face plate, as shown in Fig. 4, the tongues thus forming reinforcements or abutments for the prongs. The prongs 27 pass through the curtain 2 and are clenched or bent over upon the backing plate or ring 14, as shown in Figs. 1 and 4.

In practical operation, the button 20 is rotated until the ribs 24 on the button abut against the prongs 27. By this operation, the opening 25 in the bottom of the button is lined up with the opening 18 in the face plate 15. Thereupon the stud may be inserted into the alined openings and when the button 20 is again rotated to dispose the openings 25 and 18 out of alinement, or speaking more exactly, to dispose the extensions of these openings out of alinement, the retaining means carried by the curtain 2 will be interlocked within the notches 12 of the stud.

Having thus described the invention, what is claimed is:—

1. In a device of the class described, a back plate having an opening; a face plate spaced from the back plate to admit between the plates the material to be held, the face plate being provided with peripheral notches and having upstanding tongues at the bases of the notches, the face plate having an opening including a lateral extension; a rotatable button including a bottom and an upstanding flange, the bottom having an opening corresponding to the opening in the face plate and being provided with arcuate slots defining ribs connecting the bottom with the flange, the tongues on the face plate extending into the slots in the bottom of the button; a fastener located within the flange of the button and including prongs which pass through the slots in the bottom of the button and through the notches in the face plate in contact with the tongues of the face plate, the prongs being clenched upon the back plate and coöperating with the ribs of the button to aline the extensions of the openings in the bottom of the button and in the face plate; and a stud wherewith the button interlocks when the button is rotated to dispose the extensions of said openings out of alinement.

2. In a device of the class described, the combination with a piece of material to be held, of a face plate resting on the material, the face plate being provided with peripheral notches and having upstanding tongues at the bases of the notches, the face plate having an opening including a lateral extension; a rotatable button including a bottom and an upstanding flange, the bottom having an opening corresponding to the opening in the face plate and being provided with arcuate slots defining ribs connecting the bottom with the flange, the tongues of the face plate extending into the slots in the bottom of the button; a fastener located within the flange of the button and including prongs which pass through the slots in the bottom of the button and through the notches in the face plate in contact with the tongues of the face plate, the prongs being clenched to coöperate with the rear face of the material to be held and coöperating with the ribs of the button to aline the extensions of the openings in the bottom of the button and in the face plate; and a stud wherewith the button interlocks when the button is rotated to dispose the extensions of said openings out of alinement.

3. In a device of the class described, a back plate having an opening; a face plate spaced from the back plate to admit between the plates the material to be held, the face plate being provided with peripheral notches and being provided with an opening including a lateral extension; a rotatable button including a bottom and an upstanding flange, the bottom having an opening corresponding to the opening in the face plate and being provided with arcuate slots defining ribs connecting the bottom with the flange; a fastener located within the flange of the button and including prongs which pass through the slot in the bottom of the button and through the notches in the face plate, the prongs being clenched upon the back plate and coöperating with the ribs of the slots to aline the extensions of the openings in the bottom of the button and in the face plate; and a stud wherewith the button interlocks when the button is rotated to dispose said openings out of alinement.

4. In a device of the class described, a stud provided in its bottom with a cavity defining a marginal flange adapted to bite into the material wherewith the stud is assembled, the stud having a bore opening into the cavity; a fastening means movably mounted in the bore and extended through the cavity; the stud having external longitudinal ribs provided with opposed, transverse notches; and a holding means including a rotary element adapted to coact with the notches.

5. In a device of the class described, a back plate having an opening; a button having an opening adapted to be alined with the opening in the back plate when the button is rotated; and an annular retainer located within the contour of the button and provided with prongs coacting with the back plate, the button being provided with openings receiving the prongs and permitting a rotation of the button.

In testimony that I claim the foregoing as my own, I have hereto affixed my signature in the presence of two witnesses.

ROBERT ROSS VAN HORN.

Witnesses:
E. M. DEFENBAUGH,
A. P. MOWERY.